United States Patent [19]

Edman

[11] Patent Number: 5,412,878
[45] Date of Patent: May 9, 1995

[54] WHEEL AND HUB GAUGE

[76] Inventor: Darrell J. Edman, Rte. 1, Box 14A, Boardman, Oreg. 97818

[21] Appl. No.: 51,850

[22] Filed: Apr. 26, 1993

Related U.S. Application Data

[63] Continuation-in-part of Ser. No. 816,614, Dec. 31, 1991, abandoned.

[51] Int. Cl.6 .............................................. G01B 5/14
[52] U.S. Cl. ........................................ 33/810; 33/203
[58] Field of Search ................. 33/810, 811, 203, 600

[56] References Cited

U.S. PATENT DOCUMENTS

| | | | |
|---|---|---|---|
| 1,245,213 | 11/1917 | Gammeter | 32/203 |
| 1,737,827 | 12/1929 | Ciliske | 33/203 |
| 2,305,376 | 12/1942 | Blum | 33/810 |
| 2,799,942 | 7/1957 | Ehler | 33/810 |
| 3,070,891 | 1/1963 | Neslund | 33/811 |
| 3,845,559 | 11/1974 | Offer | 33/810 |
| 4,129,950 | 12/1978 | Weinhaus et al. | 33/600 |
| 4,566,199 | 1/1986 | Grohler et al. | 33/810 |
| 4,607,436 | 8/1986 | Clay | 33/203 |
| 4,730,399 | 3/1988 | Campbell | 33/810 |
| 5,101,569 | 4/1992 | Watkins | 33/810 |

Primary Examiner—Thomas B. Will

[57] ABSTRACT

A device for making multiple wheel measurements, which is used to measure the center line distance between adjacent lug bolt holes of a wheel or lug bolts of a hub, with graduated indicia directly displaying the wheel mounting diameters of automotive wheels in trade sizes, which will also measure the pilot diameter of a wheel and hub. This will determine the wheel mounting pattern and pilot diameter, which will determine the compatibility of a automotive wheel and hub.

5 Claims, 7 Drawing Sheets

WHEEL AND HUB GAUGE

This application is a Continuation-In-Part of prior application Ser. No. 07/816,614, filed on Dec. 31, 1991 of Darrell John Edman for Wheel Lug Gauge, now abandoned.

BACKGROUND OF THE INVENTION

1. Field of the Invention

This invention relates to a Wheel and Hub Gauge, which is a device for measuring wheel mounting patterns and pilot diameters of automotive wheels and hubs. For the lack of a fast, easy, accurate, and economical way to measure the mounting pattern and pilot diameter, automotive mechanics and service technicians have relied on memory or resorted to a trial and error fit for replacement of automotive wheels. This wastes valuable time and now with the ever increasing numbers of different automotive wheel sizes used on automotive vehicles, this task has become far more difficult.

2. Description of the Prior Art

A variety of gauges have been proposed in the prior art to aid in determining wheel mounting patterns and pilot diameters. Representative of such gauges that mostly relate are disclosed in the patents of; Weinhaus U.S. Pat. No. (4,129,950), Campbell U.S. Pat. No. (4,730,399), and Watkins U.S. Pat. No. (5,101,569).

However, none of the prior art gauges would appear to provide the ideal solution to the problems of quickly and accurately determining wheel mounting patterns and pilot diameters. Each gauge appears to have one or more of the following shortcomings. The gauges are limited by short legs or projections, unable to determine the hub pilot diameter, are too complex in construction and operation, and too expensive to manufacture.

Consequently, a need still exists for a versatile gauge which provides a fast, easy, accurate, and economical way to measure wheel mounting patterns and pilot diameters.

SUMMARY OF THE INVENTION

The present invention relates to a Wheel and Hub Gauge for making multiple measurements of automotive wheels, which is comprised of two parallel legs attached to a frame with graduated indicia, with one leg being fixed or integral at one end of the frame and one that is adjustable on the frame. The legs terminate with a taper to ensure centering in the lug bolt holes of a wheel.

The mounting pattern of a hub can be measured, with the lug bolts touching the frame and on the right side of each leg. If the hub pilot causes interference with the legs, lining the lug bolts up with a pair of reference marks on the legs will assist.

When measuring the center line distance of adjacent lug bolt holes or lug bolts, the wheel mounting pattern is directly indicated in trade sizes where the adjustable leg intersects the graduated indicia. At least one scale of graduated indicia, which are determined by the number of lug bolts, is required. This invention anticipates multiple scales such as: four and five bolt scales could be combined for measuring car wheels; four, five and six bolt scales could be combined for measuring cars and light trucks; or six, eight and ten bolt scales could be combined for measuring truck wheels. The scale(s) of graduated indicia may be divided, where inches are read on one side of the adjustable leg and millimeters on the other side.

To assist with determining the pilot diameter, a scale of graduated indicia in correlation with the inside parallel flat sides of the legs is for measuring the hub pilot diameter, and a scale of graduated indicia in correlation with the outside parallel flat sides of the legs can be used for measuring the wheel pilot hole diameter.

A hole in the frame on the end opposite the fixed leg, permits a key ring to be used for convenience, and would also prevent detachment of the adjustable leg from the frame.

It is advantageous to have a gauge with legs of adequate length: to prevent the frame from contacting the hub cap ring found on most wheels, to bridge the frame over the spokes found on some custom wheels, or with the growing popularity of modular styled wheels with the center recessed; this invention will assist viewing the indicia when measuring the front side of a wheel. Often wheels are stored on racks with just the rim exposed, without evidence to which is the front or back. By rolling the wheel forward and balancing it on the front bar of the rack, this gauge can be utilized on either the front or back without removing the wheel from the rack, saving valuable time.

In an inexpensive version, the gauge can be made from stamped parts, or a more accurate and costly version, could be machined from stainless steel and inscribed with the indicia and reference marks.

However, an accurate, durable, and inexpensive gauge can be made from an extrusion this would eliminate costly machining and reduce material waste. A frame made from an extrusion can easily be designed with a recess in the back, contributing to an ergonomic design, which enables a natural one hand procedure with exceptional control by placing the finger tips in the recess and the thumb on the adjustable leg. Reference marks on the legs, which are used when measuring adjacent lug bolts if the hub pilot causes interference, are easily incorporated in an extrusion. This invention is designed so the legs can be sized to the frame, which allows for commercial tolerances of an extrusion, eliminating costly precision extruding.

Having the indicia on a label would facilitate model changes during manufacturing and allow economical updating with new wheel mounting sizes.

BRIEF DESCRIPTION OF THE DRAWINGS

For illustration of my invention, reference is made to the accompanying drawings in which.

DETAILED DESCRIPTION OF THE DRAWINGS

Figure 1:
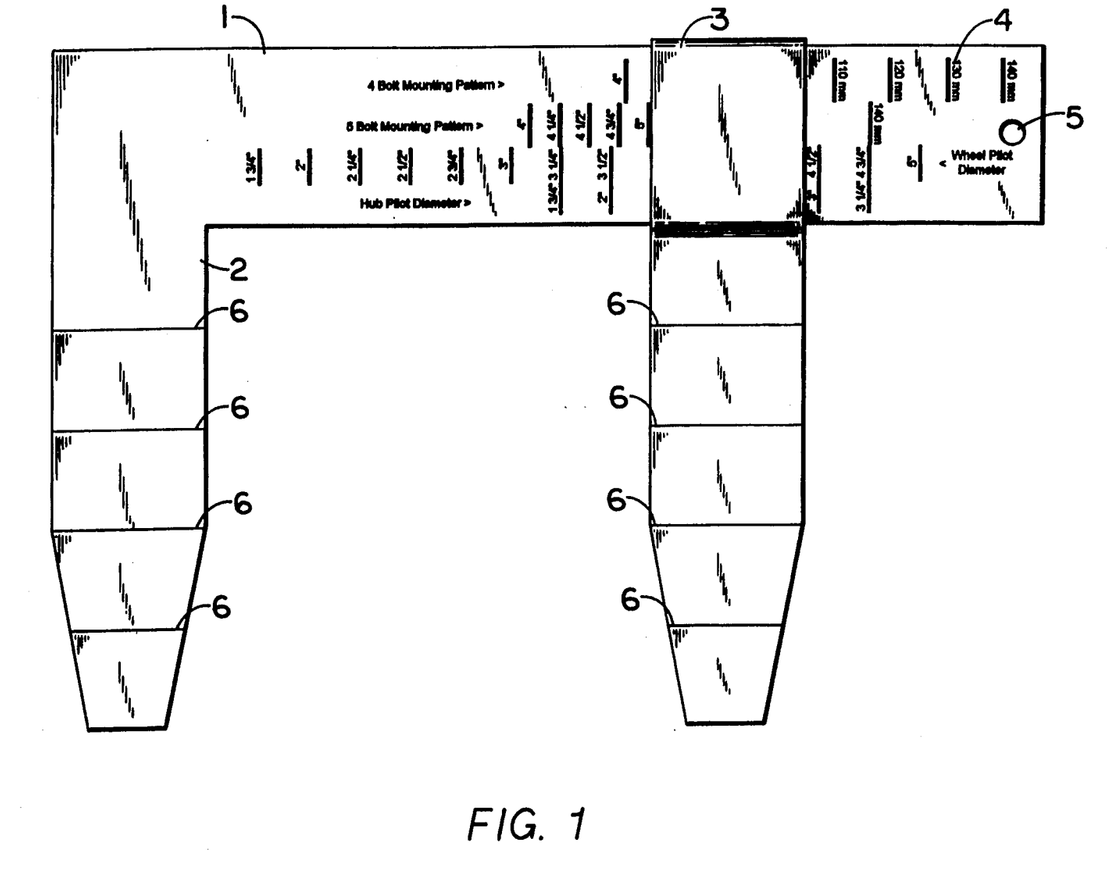
FIG. 1, is a plan view Wheel and Hub Gauge in its simplest form.

Referring to the drawings, FIG. 1, is an embodiment of the invention shown in its simplest form, in which the frame member 1, is integral with the fixed member 2, and the adjustable member 3, which adjustably slides on the frame member 1, with a slip fit. The fixed member 2 and the adjustable member 3 terminate with a taper to ensure centering in the lug bolt holes. The scales of graduated indicia 4 and reference marks 6, are inscribed on the frame member 1, the fixed member 2, and the adjustable member 3.

Referring to FIGS. 2 thru 6, the frame member 1, the fixed member 2, and the adjustable member 3, are made from an extrusion. This eliminates costly machining and reduces material waste. The fixed member 2 is attached perpendicular to the frame member 1 with drive screws 7, and the adjustable member 3 which is perpendicular to the frame member 1 and parallel to the fixed member 2, extending outwardly terminating with a taper. An opening 5 in the frame member 1 permits a key ring to be used for convenience and would also prevent detachment of the adjustable member 3, from the frame member 1.

Figure 2:
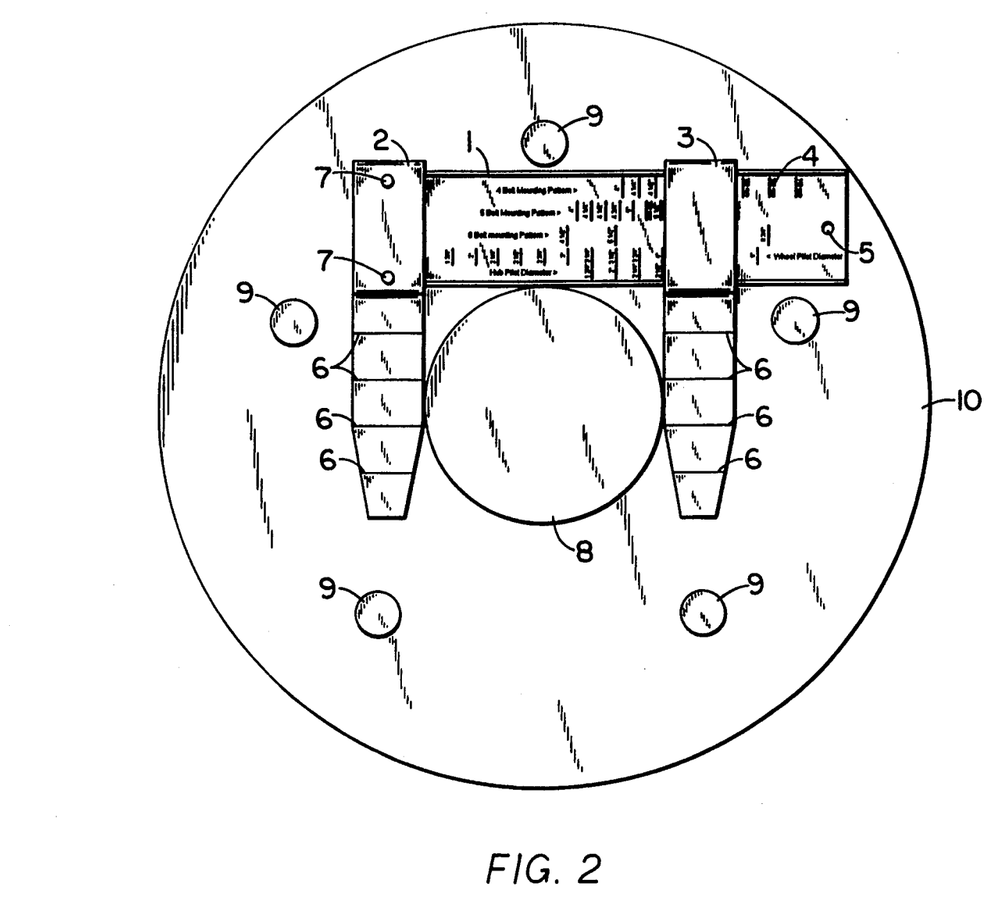
FIG. 2, is a elevation view of the Wheel and Hub Gauge determining the pilot diameter of a hub.

Referring to FIG. 2, the invention is shown measuring the hub pilot diameter 8 of a five lug bolt 9 hub 10. The bottom scale of the graduated indicia 4 is in correlation with the inside parallel flat sides of the of the fixed member 2 and the adjustable member 3, which is used for determining the pilot diameter 8.

Figure 3:
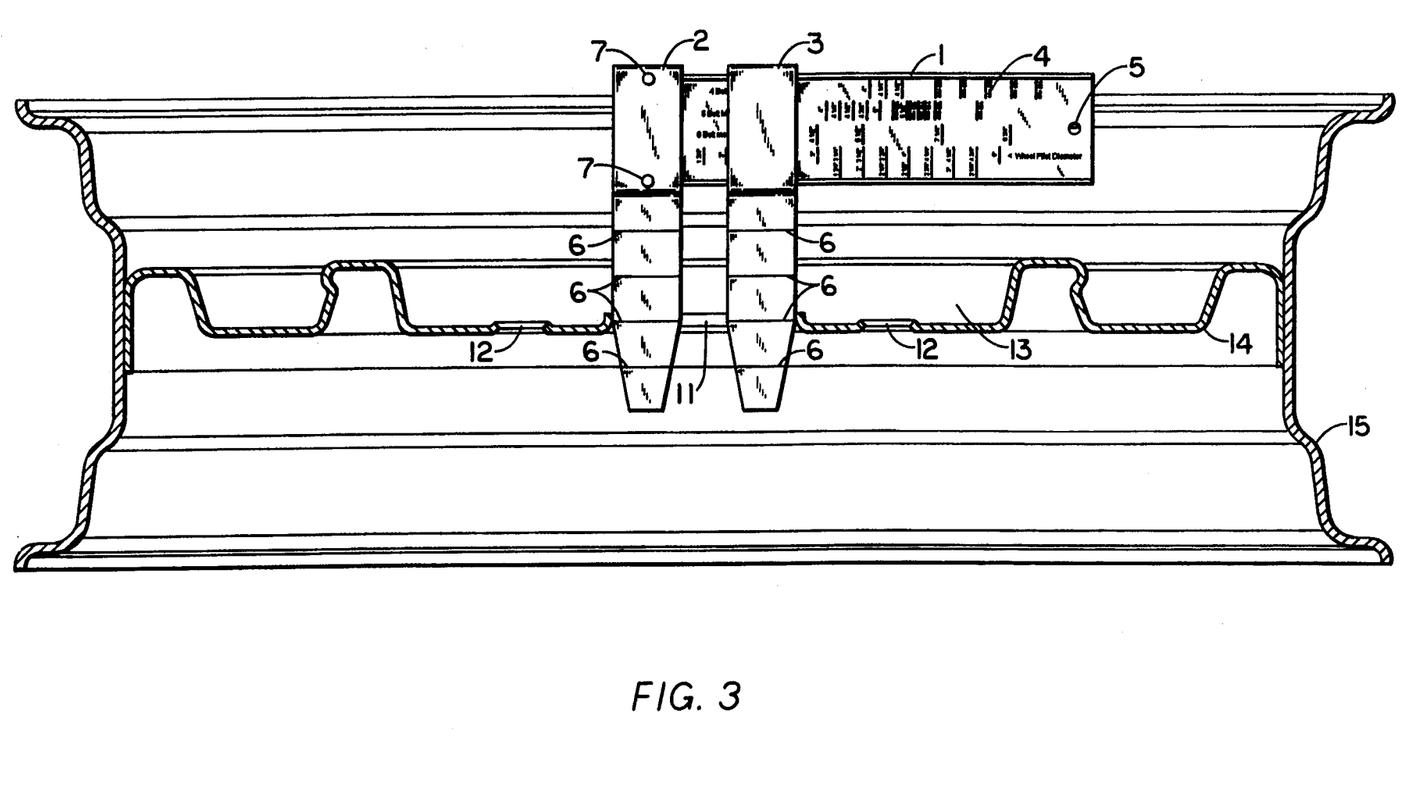
FIG. 3, is a elevation view of the Wheel and Hub Gauge determining the pilot diameter of a wheel.

Referring to FIG. 3, the invention is shown determining the pilot diameter 11 of the wheel disc 14, which is integral with the wheel rim 15. The cross sectional view depicts a four bolt steel wheel cut through the center line of the pilot 11. To assist with determining the pilot diameter 11, the second scale from the bottom of the graduated indicia 4, is in correlation with the outside parallel flat sides of the fixed member 2 and the adjustable member 3. The wheel pilot diameter 11, is displayed where the right side of the adjustable member 3 intersects the graduated indicia 4.

Figure 4:
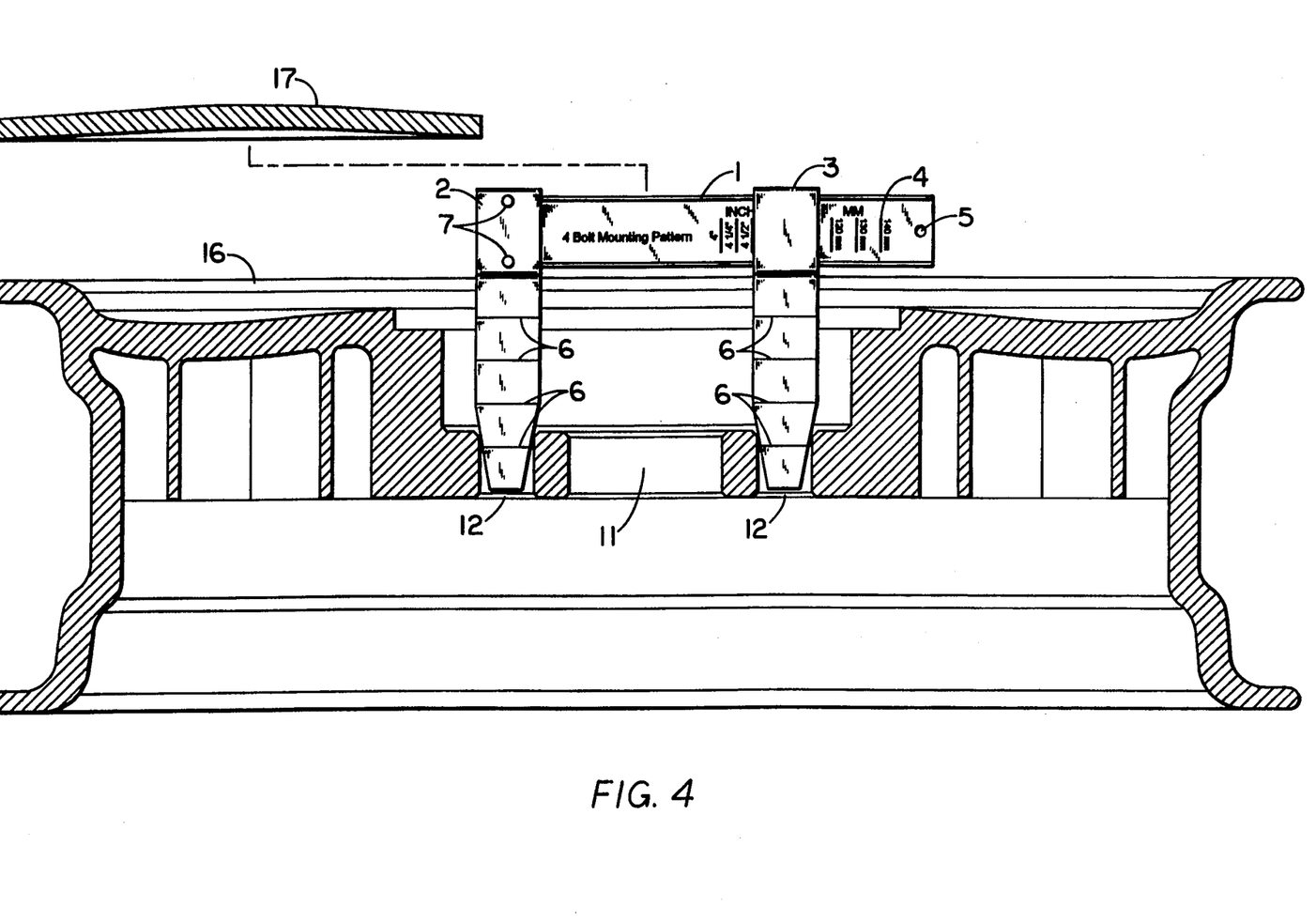
FIG. 4, is a elevation view of the Wheel and Hub Gauge calculating the mounting pattern of a wheel.

Referring to FIGS. 3 and 4, the advantage of having the fixed member 2 and the adjustable member 3, of adequate length to prevent the frame member 1 from contacting the hub cap ring 13, or to reach the lug bolt holes 12 of the recessed center of a modular wheel 16, becomes readily apparent.

Referring to FIG. 4, the invention is shown determining the mounting pattern of a modular styled wheel 16, with an integral hub cap 17. The acute angles of the tapers on the ends of the fixed member 2 and the adjustable member 3, assist centering in the lug bolt holes 12. The cross sectional view depicts a four bolt wheel cut through the center line of adjacent lug bolt holes 12. The mounting pattern is displayed where the adjustable member 3 intersects the graduated indicia 4. In this case the left side of the adjustable member 3 intersects the $4\frac{1}{2}''$ trade size on the singular four bolt mounting scale of the graduated indicia 4, indicating a $4\frac{1}{2}''$ mounting pattern. If the adjustable member 3 would have intersected a trade size of graduated indicia 4 on the right side of the adjustable member 3, the mounting pattern would be displayed in metric measurement.

Figure 5:
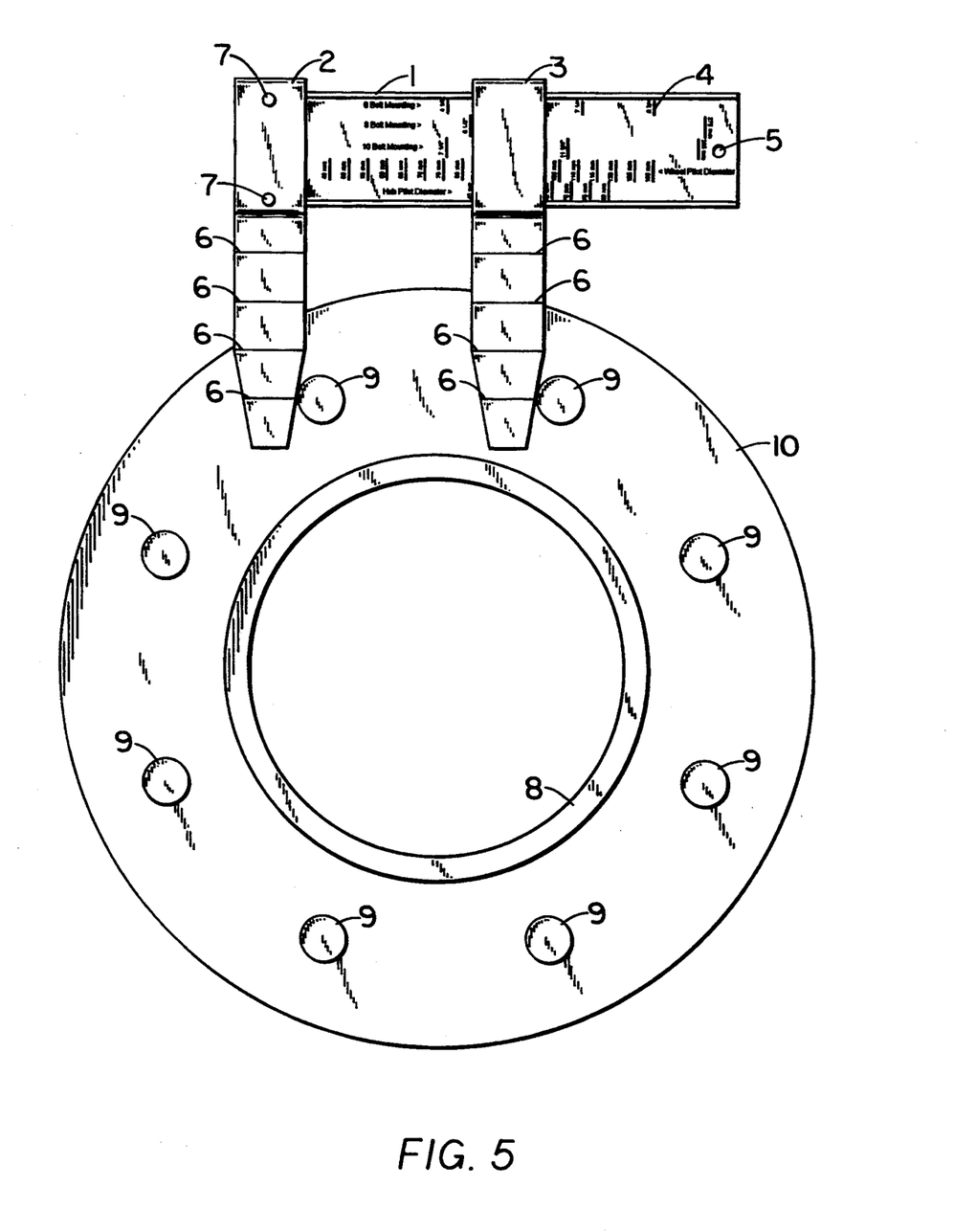
FIG. 5, is a elevation view of the Wheel and Hub Gauge calculating the mounting pattern of a hub.

Referring to FIG. 5, the invention is shown determining the mounting pattern of a hub 10, which can be measured with the adjacent lug bolts 9 touching the frame member 1, and on the right side of the fixed member 2 and the adjustable member 3. If the hub pilot 8 causes interference with the fixed member 2 and the adjustable member 3, lining the lug bolts 9 up with a pair of the reference marks 6 will assist. In this case the left side of the adjustable member 3, intersects the $6\frac{1}{2}''$ trade size of the eight bolt mounting pattern scale of the graduated indicia 4.

Referring to FIGS. 4 and 5, when measuring the center line distance of adjacent lug bolts 9, the measurement is calculated to exhibit a scale of graduated indicia 4 dependant on the number of lug bolts 9, which are directly displayed in the wheel mounting diameters in trade sizes, with trade sizes in inches read on the left side of the adjustable member 3, and trade sizes in millimeters read on the right side of the adjustable member 3.

Referring to FIGS. 2 thru 11, the graduated indicia 4, is in the form of a label, with the scale(s) imprinted thereon. Having the graduated indicia 4, on a label would facilitate model changes during manufacturing, and allow economical updating with new wheel mounting sizes.

Figure 8:
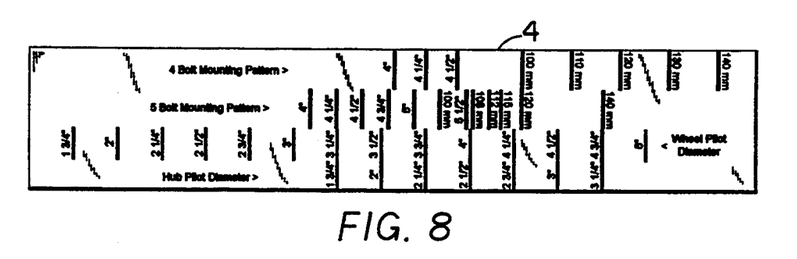
FIG. 8, is a plan view of a label with scales of graduated indicia representing, four and five bolt mounting patterns, and pilot diameters.

Referring to FIGS. 1 and 8, the scales of graduated indicia 4, depict mounting patterns for four and five bolt wheels and hubs, and scales for measuring the pilot diameters.

Figure 9:
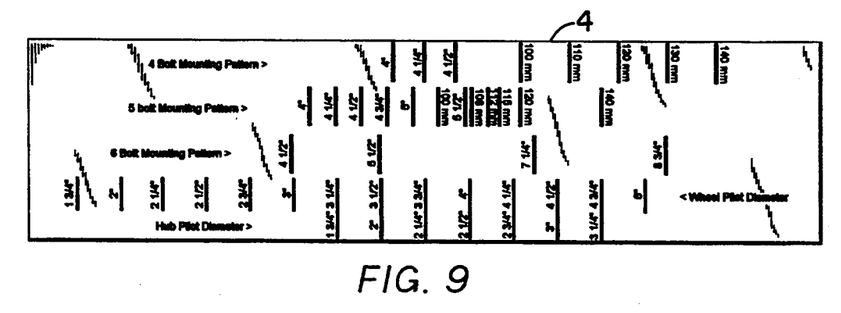
FIG. 9, is a plan view of a label with scales of graduated indicia representing, four, five and six bolt mounting patterns, and pilot diameters.

Referring to FIGS. 2, 3 and 9, the scales of graduated indicia 4, depict mounting patterns for four, five and six bolt wheels and hubs, and scales for measuring the pilot diameters.

Referring to FIG. 4, the singular scale of graduated indicia 4, depicts the mounting pattern for four bolt wheels and hubs.

Figure 6:
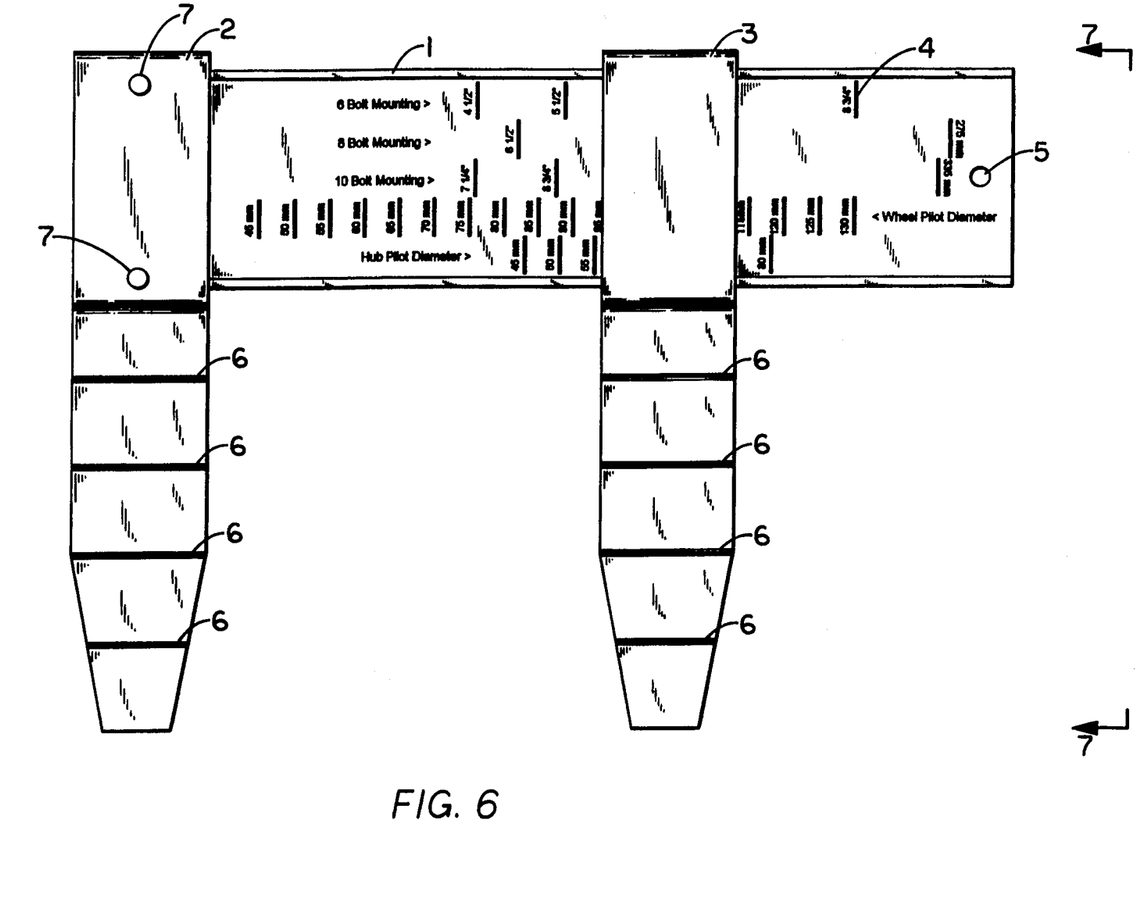
FIG. 6, is a plan view of the front side of the Wheel and Hub Gauge.
Figure 10:
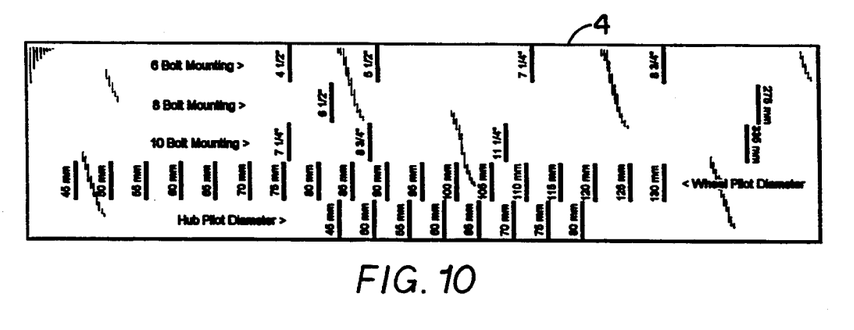
FIG. 10, is a plan view of a label with scales of graduated indicia representing, six, eight and ten bolt mounting patterns, and pilot diameters.

Referring to FIGS. 5, 6 and 10, the scales of graduated indicia 4, depict mounting patterns for six, eight and ten bolt wheels and hubs, and scales for measuring the pilot diameters.

Figure 11:
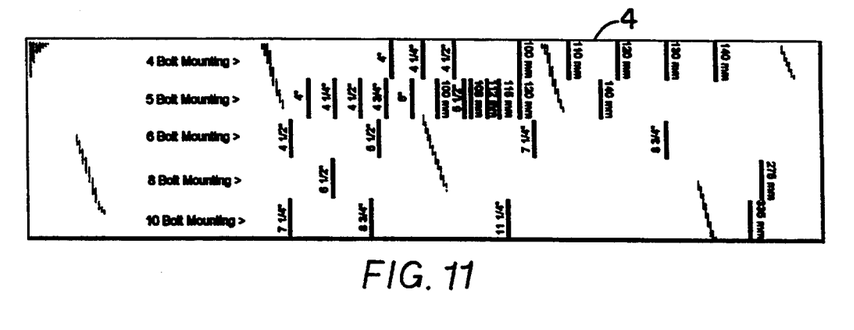
FIG. 11, is a plan view of a label with scales of graduated indicia representing, four, five, six, eight and ten bolt mounting patterns.

Referring to FIG. 11, the scales of graduated indicia 4, depict mounting patterns for four, five, six, eight and ten bolt wheels and hubs.

Figure 7:
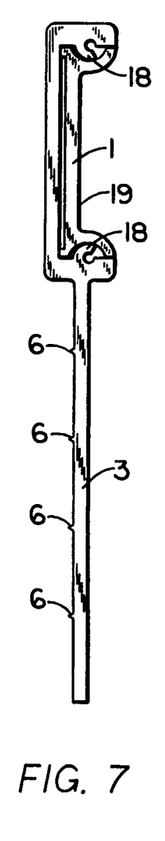
FIG. 7, is a end elevation view of the adjustable member 3 and the frame member 1, as seen along the line 7—7 of FIG. 6.

Referring to FIG. 7, which is an end elevation view of FIG. 6, showing the relationship of the frame member 1 and the adjustable member 3, with a means for sizing 18 the adjustable member 3, to the frame member 1, with a slip fit. This allows for commercial tolerances of an extrusion, eliminating costly precision extruding. The recess 19, which is on the back side of the frame member 1, contributes to an ergonomic design, which enables a natural one hand procedure with exceptional control by placing the finger tips in the recess 19 and the thumb on the adjustable member 3.

Although several detailed embodiments of the invention are illustrated in the drawings and previously described in detail, this invention contemplates using any dimensionally stable material, in any configuration, design and relationship of components which will function in a similar manner and which will provide the equivalent result.

I claim:

1. A Wheel and Hub Gauge for making multiple measurements of automotive wheels and hubs with a plurality of lug bolts, which comprises: an elongated frame member generally forming a channel, the recessed side of said channel being the back and opposite the face, with at least one divided scale of graduated indicia on said face, said divided scale having a first scale portion in inches and fractions of an inch and a second scale portion in millimeters, representative of the manufactures published mounting pattern in trade sizes, respective of the number of lug bolts; a pair of members extending perpendicular to the longitudinal axis of said frame member, having a first end portion attached to said frame member, an elongated mid portion and a tapered second end portion, one of said members being in a fixed position on said frame member proximate one end thereof, the other member being mounted on and adjustable along the length of said frame member, said first end portion defining a channel open at its opposite edges with the recessed side of said channel being the back and opposite the front, said members having a predetermined width that enables only one of said opposite edges of said first end portion of said adjustable member to intersect a graduation of said divided scale, of either said first scale portion which is in correlation with the first edge or said second scale portion which is in correlation with the second edge of said opposite edges, when moved along said frame member; wherein when said tapered second end portions engage adjacent lug bolt holes when gauging a wheel or where the same side of the opposite edges of said elongated mid portions abut adjacent lug bolts when gauging a hub, directly reading said manufactures published mounting pattern in trade sizes, where one of said opposite edges intersects a graduation of said divided scale of graduated indicia.

2. A Wheel and Hub Gauge as claimed in claim 1, further comprising a plurality of divided scales of graduated indicia disposed on said face of said frame member, representative of the manufactures published mounting patterns in trade sizes, of inches and fractions of an inch and millimeters, respective of the number of lug bolts to be gauged.

3. A Wheel and Hub Gauge as claimed in claim 1, further comprising a supplementary pair of scales of graduated indicia disposed on said face of said frame member, for determining a first and second pilot diameter: said first pilot diameter defining the diameter of the cylindrical projection disposed in the center of a hub and said second pilot diameter defining the inside diameter of the center hole of a wheel; the first supplementary scale of graduated indicia in correlation with the inside parallel edges of the opposite edges of said elongated mid portions of said fixed member and said adjustable member, used for gauging said first pilot diameter, reading said first pilot diameter where said first edge of said first end portion of said adjustable member intersects said first supplementary scale; and the second supplementary scale of graduated indicia in correlation with the outside parallel edges of the opposite edges of said elongated mid portions of said fixed member and said adjustable member, for gauging said second pilot diameter, reading said second pilot diameter where said second edge of said first end portion of said adjustable member intersects said second supplementary scale; said first supplementary scale and said second supplementary scale of graduated indica, of equal proportion when referencing their respective scales.

4. A Wheel and Hub Gauge as claimed in claim 1, further comprising a plurality of reference marks to assist gauging the mounting pattern of a hub if a hub pilot interferers: said reference marks being disposed perpendicularly on said front of said elongated mid portion and said tapered second end portion of said fixed member and said adjustable member; wherein if said hub pilot interferes with said tapered second end portion of said fixed member and said adjustable member when gauging said mounting pattern, aligning a complimentary pair of said reference marks with adjacent lug bolts will simplify the gauging of said hub.

5. A Wheel and Hub Gauge as claimed in claim 1, further comprising an attachable label marked with said at least one divided scale of graduated indicia attached to said face of said frame member, wherein said label can be replaced with a second label marked with a different, said at least one divided scale or a pair of supplementary scales of graduated indicia, to vary the measurement being made by the gauge.

* * * * *